(12) United States Patent  (10) Patent No.: US 6,520,575 B1
Yuzawa  (45) Date of Patent: Feb. 18, 2003

(54) VEHICLE SEAT HAVING CONTAINER HOLDER AND CONTAINER HOLDER

(75) Inventor: Yoshikuni Yuzawa, Shioya-gun (JP)

(73) Assignee: TS Tech, Co., Ltd., Asaka (JP)

( * ) Notice: Subject to any disclaimer, the term of this patent is extended or adjusted under 35 U.S.C. 154(b) by 0 days.

(21) Appl. No.: 09/977,954

(22) Filed: Oct. 17, 2001

(30) Foreign Application Priority Data

Aug. 10, 2001 (JP) ........................................ 2001-244240

(51) Int. Cl.⁷ ................................................ A47C 7/62
(52) U.S. Cl. ............................ 297/188.01; 297/188.08; 297/188.19; 248/311.2
(58) Field of Search ....................... 297/188.08, 188.13, 297/188.14, 188.15, 188.21, 188.01, 188.07, 188.19; 248/311.2, 316.5, 291.1, 292.11, 292.13

(56) References Cited

U.S. PATENT DOCUMENTS

| 5,085,390 A | * | 2/1992 | Murphy .................... 248/205.5 |
| 5,104,187 A | * | 4/1992 | Fischer et al. ............ 248/311.2 |
| 5,358,307 A | * | 10/1994 | Shafer et al. ............... 224/275 |
| 5,690,308 A | * | 11/1997 | Jankovic ................... 248/311.2 |
| 5,899,426 A | * | 5/1999 | Gross et al. ................. 224/926 |
| 6,047,937 A | * | 4/2000 | Huang ..................... 248/311.2 |
| 6,085,953 A | * | 7/2000 | Bober et al. ................ 224/282 |
| 6,349,913 B1 | * | 2/2002 | Jankowski .................. 224/281 |
| 6,439,525 B1 | * | 8/2002 | Gehring et al. .......... 248/311.2 |

* cited by examiner

Primary Examiner—Peter M. Cuomo
Assistant Examiner—Erika Garrett
(74) Attorney, Agent, or Firm—Oliff & Berridge, PLC

(57) ABSTRACT

A vehicle seat having a container holder which is stably attached to the vehicle seat even if a base member is not fixed to the vehicle seat in the whole area of the base member is provided. The vehicle seat comprises a seat body, a side cover attached to a side portion of the seat body, and a cup holder. A penetrating opening is formed in the side cover. The cup holder comprises a base member of which an upper portion is fixed to the side cover, and a saucer member turnably supported up and down to the base member. Penetrating openings are formed in the base member. The saucer member is provided with curved bars curving and projecting toward the base member. When the saucer member stands vertically, the curved bars penetrate the penetrating openings and are hooked on the side cover.

9 Claims, 10 Drawing Sheets

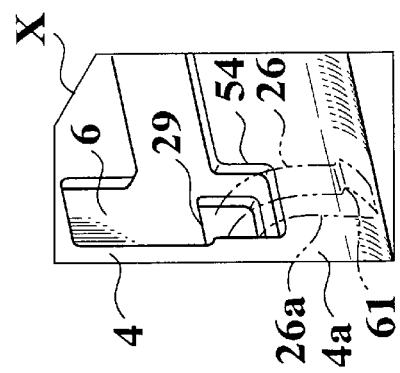
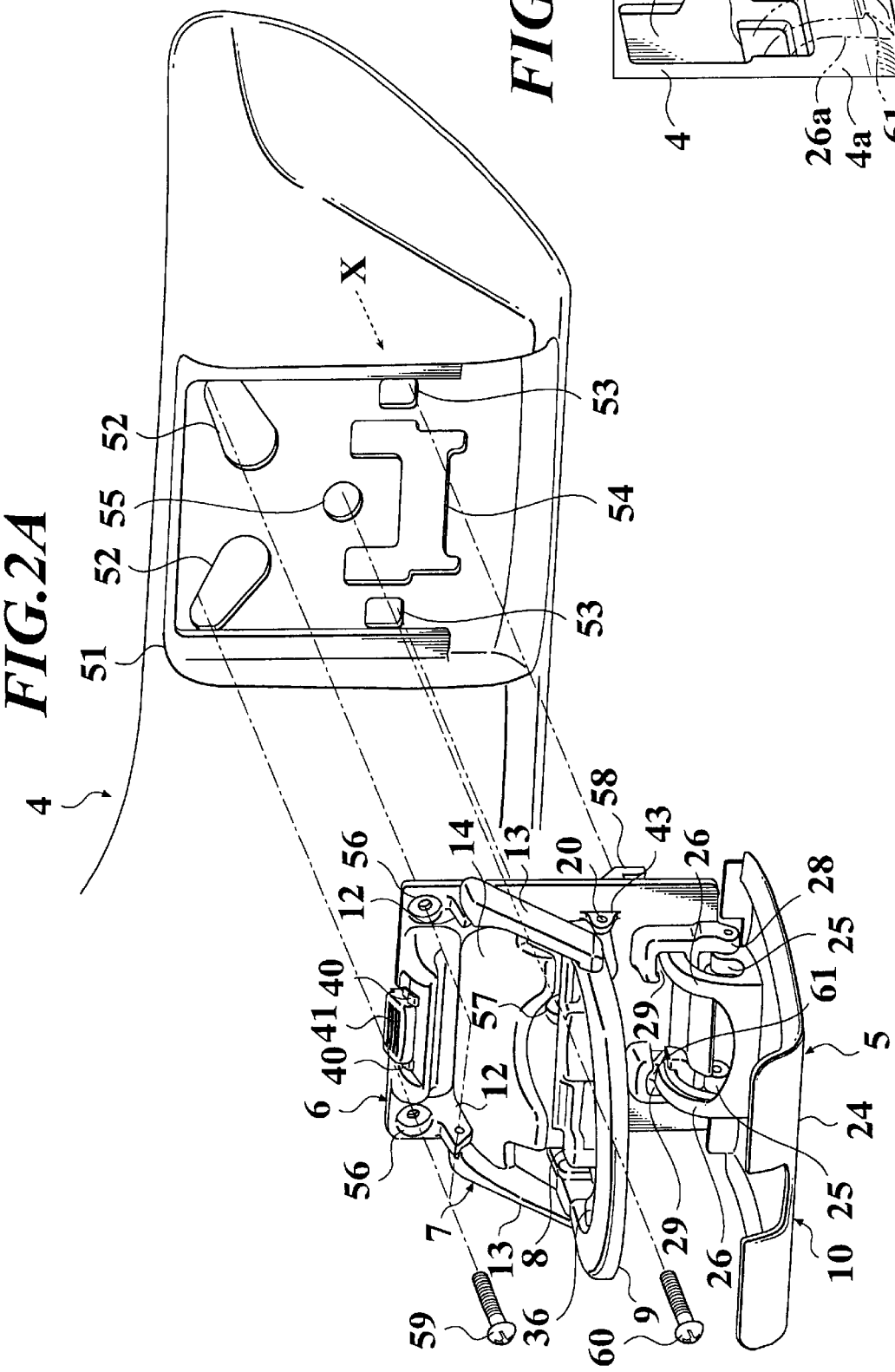

VEHICLE SEAT HAVING CONTAINER HOLDER AND CONTAINER HOLDER

BACKGROUND OF THE INVENTION

1. Field of the Invention

The present invention relates to a vehicle seat which is provided with a container holder which holds a container, such as a can, a PET bottle, a cup or the like for drinks.

2. Description of Related Art

The interior of a vehicle or the like is provided with a container holder which is the so-called cup holder for holding a can or the like for drinks. The container holder comprises a base member extending vertically and a saucer member for holding a bottom surface of the container. For example, the saucer member is connected to a front surface of the base member through a hinge on which the saucer member is turnable up and down. When the saucer member is housed or closed, the saucer member is approximately parallel to the base member. On the other hand, when the passenger or occupant opens and levels off the saucer member in order to use the container holder, the saucer member is brought into contact with a stopper which is integrally formed with the base member. Thereby, the saucer member is maintained in an approximately horizontal position.

Such a container holder may be attached to a vehicle seat for the passenger to sit in. When the container holder is attached to the vehicle seat, while a back surface of the base member is brought into contact with an attachment portion of the vehicle seat, a fixing member or a fastening member, such as a vis, a screw or a bolt, is got through the base member from the front surface to the back surface of the base member, and then screwed into the attachment portion of the vehicle seat or fastened thereto. However, because the saucer member is connected to the front surface of the base member, the screwing or fastening of a plurality of the fixing members is difficult in the whole area of the front surface of the base member. That is, because the saucer member overlap with a portion of the base member, the saucer member interferes the screwing or fastening.

Thus, the fixing member is screwed in or fastened to only a portion to which the saucer member is not connected, that is, a portion which is not interfered by the saucer member. In this case, however, the container holder is not stably attached to the vehicle seat.

SUMMARY OF THE INVENTION

The present invention was developed in view of the above-described problem. Therefore, an object of the present invention is to provide a vehicle seat having a container holder which is stably attached to the vehicle seat even if a base member is not fixed to the vehicle seat in the whole area of the base member. Another abject of the present invention is to provide such a container holder.

In order to accomplish the above-described object, in one aspect of the present invention, a vehicle seat having a container holder comprises a container holder. The container holder comprises a base member extending vertically, and a saucer member supported to a lower portion of a front surface of the base member. The saucer member is turnable up and down on the lower portion of the front surface of the base member and capable of turning from a standing position to a horizontal position which is approximately horizontal such that a container can be placed on the saucer member. The vehicle seat having a container holder further comprises a seat body in which a passenger sits, and a side member attached to a side portion of the seat body. An upper portion of the base member is secured to a front surface of the side member. A first penetrating opening which penetrates the base member from the front surface to a back surface is formed in a lower portion of the base member. A second penetrating opening which penetrates the side member from the front surface to a back surface is formed in a lower portion of the side member. The saucer member comprises a bar-like member projecting from the saucer member which is held in the horizontal position toward the base member. When the saucer member is held in the standing position, the bar-like member penetrates the first penetrating opening and the second penetrating opening and is hooked on the back surface of the side member.

According to the vehicle seat having a container holder, when the saucer member turns from the horizontal position to the standing position, the bar-like member moves to the side of the back surface of the side member through the first penetrating opening and the second penetrating opening, and then is hooked on the lower portion of the side member. Since the saucer member which is supported to the lower portion of the base member has the bar-like member, when the bar-like member is hooked on the lower portion of the side member, the lower portion of the base member is supported by the side member. Thus, when the saucer member is held in the standing position, the upper portion of the base member is secured to the side member, while the lower portion of the base member is supported by the side member. Therefore, the container holder is stably installed in the seat body to which the side member is attached.

When the saucer member is held in the standing position, if the passenger accidentally pulls the base member away from the side member, moment is not applied against the base member with respect to the upper portion of the base member, because the bar-like member is hooked on the lower portion of the side member. The upper portion of the base member is the place where the base member is secured to the side member. Thus, the load is not concentrated in the upper portions of the base member and the side member. Therefore, even if the passenger accidentally pulls the base member, the breakage of the base member and the side member is prevented. On the other hand, when the saucer member is held in the horizontal position, the container is placed on the saucer member. The saucer member is supported to or connected with the lower portion of the base member, so that moment is applied against the base member with respect to the upper portion of the base member by the weight of the container. However, this moment is applied in the direction that the lower portion of the base member is pressed against the side member, so that the load is not concentrated in the upper portion of the base member, and the base member is firmly secured to the side member. Therefore, the container holder is stable with respect to the seat body to which the side member is attached.

The side member may have a flat area in the back surface of the side member, while the bar-like member may have a flat surface in an edge portion of the bar-like member. When the saucer member is held in the standing position, the bar-like member may be hooked on the back surface of the side member while the flat surface may abut with the flat area.

According to the vehicle seat having a container holder, the flat surface in the edge portion of the bar-like member may abut with the flat area in the back surface of the side member, so that the bar-like member may stably be hooked on the back surface of the side member when the saucer member is held in the standing position.

A recess portion may be formed in the side member. The base member may be disposed on a bottom surface of the recess portion and secured to the side member. When the saucer member is held in the standing position, the saucer member may be disposed in the recess portion such that a front surface of the saucer member may be flush with the front surface of the side member.

According to the vehicle seat having a container holder, the base member may be secured to the bottom surface of the recess portion formed in the side member, and the saucer member is turnably supported to the lower portion of the base member. Therefore, when the saucer member turns from the horizontal position to the standing position, the base member may stand between the side member and the saucer member. When the saucer member is held in the standing position, because the saucer member may be disposed in the recess portion, the saucer member and the base member may be housed in the recess portion. Furthermore, since the front surface of the saucer member may be flush with the front surface of the side member, the saucer member may neatly be housed in the recess portion and the saucer member may not interfere with the operation or view of the passenger.

The side member may be attached to a side portion of a seat bottom of the seat body, so that the container holder may be disposed in a side of the seat bottom.

According to the vehicle seat having a container holder, the container holder may be disposed in the side of the seat bottom, so that the container placed on the saucer member may be disposed in a range where the passenger who sits in the seat bottom can get at the container. Therefore, vehicle seat having a container holder, which is easy to use may be provided. That is, the passenger can place the container on the saucer member or pick up the container placed on the saucer member without changing his position.

With the vehicle seat having a container holder, the base member may be provided with a first engaging portion which may be disposed in the first penetrating opening, while the bar-like member may comprise a second engaging portion which engages with the first engaging portion to hold the saucer member in the horizontal position. At least one of the first engaging portion and the second engaging portion may have flexibility. When at least one of the first engaging portion and the second engaging portion bends, engagement between the first engaging portion and the second engaging portion may be released such that the saucer member may turn downward from the horizontal position.

According to the vehicle seat having a container holder, when the saucer member is held in the horizontal position, the first engaging portion may engage with the second engaging portion, holding the saucer member in the horizontal position. If an excessive load is applied to the saucer member which is held in the horizontal position in the direction of turning downward because of, for example, carelessness of the passenger, the first engaging portion or the second engaging portion may bend because of its flexibility. Thus, the engagement between the first engaging portion and the second engaging portion may be released, so that the saucer member can turn downward further. Therefore, the first engaging portion and the second engaging portion may not receive the excessive shearing force, so that the first engaging portion and the second engaging portion may not be broken. As a result, heightening of the rigidity of the first engaging portion or the second engaging portion may not be required, and thus thickening of the wall thickness of the first engaging portion or the second engaging portion may not be required for improving the rigidity. Therefore, the enlargement of the container holder may be prevented.

With the vehicle seat having a container holder, an energizing member may be disposed between the base member and the saucer member. The energizing member may energize the saucer member so that the saucer member may turn from the standing position to the horizontal position. The base member may comprise an engaging portion for standing position, which is capable of engaging with the saucer member such that the saucer member is held in the standing position.

According to the vehicle seat having a container holder, the energizing member may energize the saucer member so that the saucer member may turn from the standing position to the horizontal position, thus the horizontal position of the saucer member may be maintained under normal conditions. When the passenger or the like turns the saucer member from the horizontal position to the standing position against the energizing member, the engaging portion for standing position may engage with the saucer member, so that the standing position of the saucer member may be maintained.

In accordance with another aspect of the present invention, a container holder comprises a base member extending vertically, in which a first penetrating opening which penetrates the base member from a front surface to a back surface is formed in a lower portion of the base member. An upper portion of the base member is adapted to be secured to a front surface of a side member which is attached to a side portion of a vehicle seat body. The container holder also comprises a saucer member supported to a lower portion of a front surface of the base member. The saucer member is turnable up and down on the lower portion of a front surface of the base member and capable of turning from a standing position to a horizontal position which is approximately horizontal such that a container can be placed on the saucer member. The saucer member comprises a bar-like member projecting from the saucer member which is held in the horizontal position toward the base member. When the saucer member is held in the standing position, the bar-like member penetrates the first penetrating opening and is adapted to penetrate a second penetrating opening which is formed in a lower portion of the side member. The bar-like member is also adapted to be hooked on a back surface of the side member.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2A is a perspective exploded view of the container holder which is detached from a side cover of the vehicle seat;

FIG. 2B is an enlarged schematic perspective view of a back surface of the side cover when the cup holder is attached to the side cover, when looking from the direction indicated with X;

PREFERRED EMBODIMENT OF THE INVENTION

Figure 1:
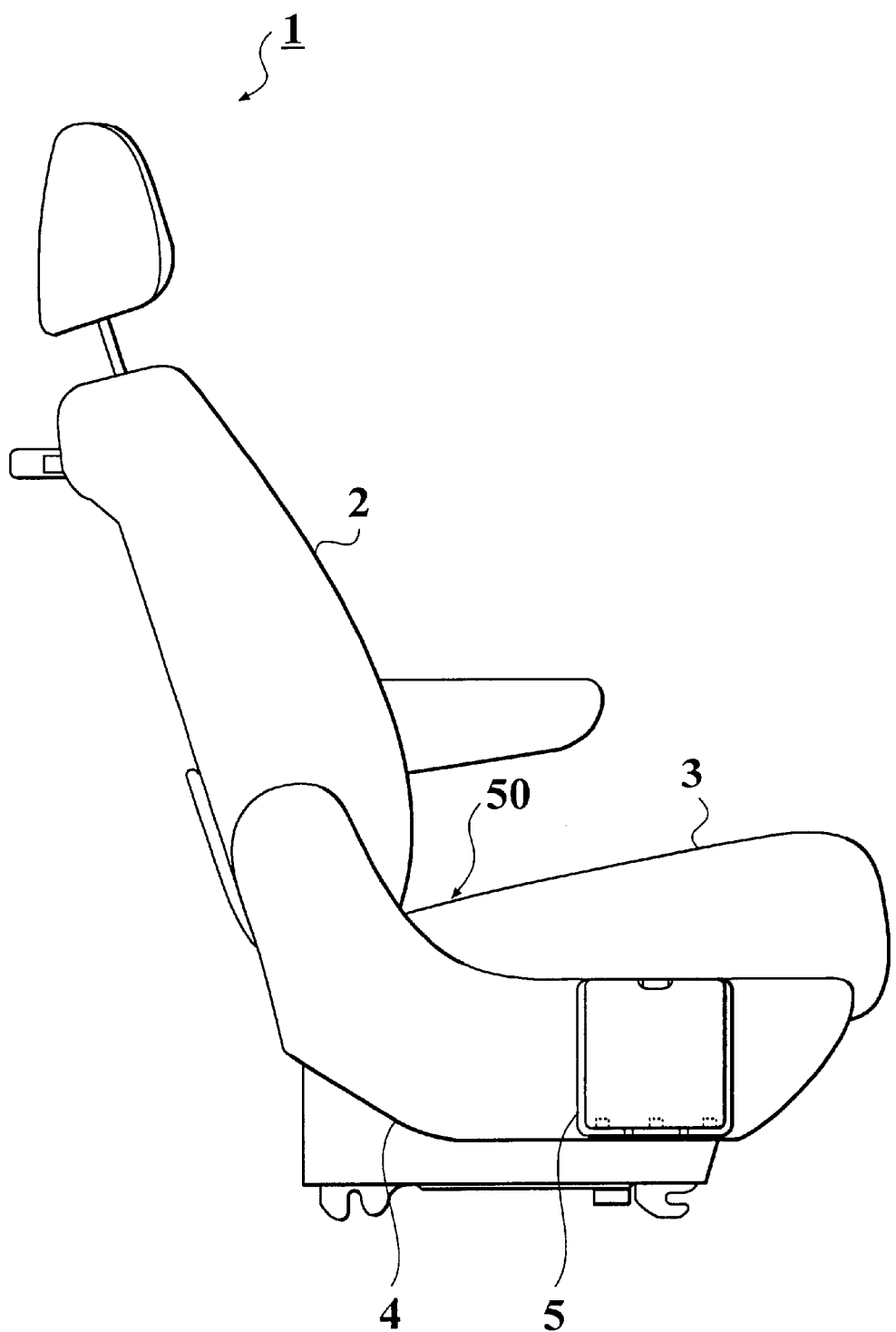
FIG. 1 is a side view of a vehicle seat having a container holder, according to an embodiment of the present invention.

An embodiment of a vehicle seat having a container holder in accordance with the present invention will be explained with reference to drawings. However, the scope of the present invention is not limited to the example shown in the drawings.

FIG. 1 is a side view of a vehicle seat 1. The vehicle seat having a container holder according to the present invention is applied to the vehicle seat 1 which is disposed in the interior of the vehicle. The vehicle seat 1 comprises a seat body 50 comprising a seat back 2 and a seat bottom 3. The seat body 50 is the one for passenger to sit therein. Various members are attached to the seat body 50, assembling the vehicle seat 1.

When the passenger sits in the seat body 50, the buttocks of the passenger are put on the seat bottom 3. The seat back 2 is disposed on the rear portion of the seat bottom 3 and extends upward therefrom. When the passenger sits in the seat body 50, the back of the passenger is supported by the seat back 2.

The vehicle seat 1 further comprises a side cover 4, that is, a side member which is attached to a side portion of the seat back 2 and the seat bottom 3, and a cup holder, that is, a container holder 5 which is integrally attached to the side cover 4. The side cover 4 extends in an approximately L-like shape from a lower portion of the seat back 2 to a neighborhood of a fore edge of the seat bottom 3. The cup holder 5 is attached to a fore portion of the side cover 4, and is disposed at a position a predetermined distance apart from a rear edge of the seat bottom 3 toward the front. That is, the cup holder 5 is disposed in positions where the passenger can get at the cup holder 5, even if the passenger sits in the seat bottom 3 in a forward-looking attitude. The cup holder 5 is used for holding a can, a PET bottle, a cup or the like (hereinafter, it is referred to as "a container") for drinks.

Figure 3:
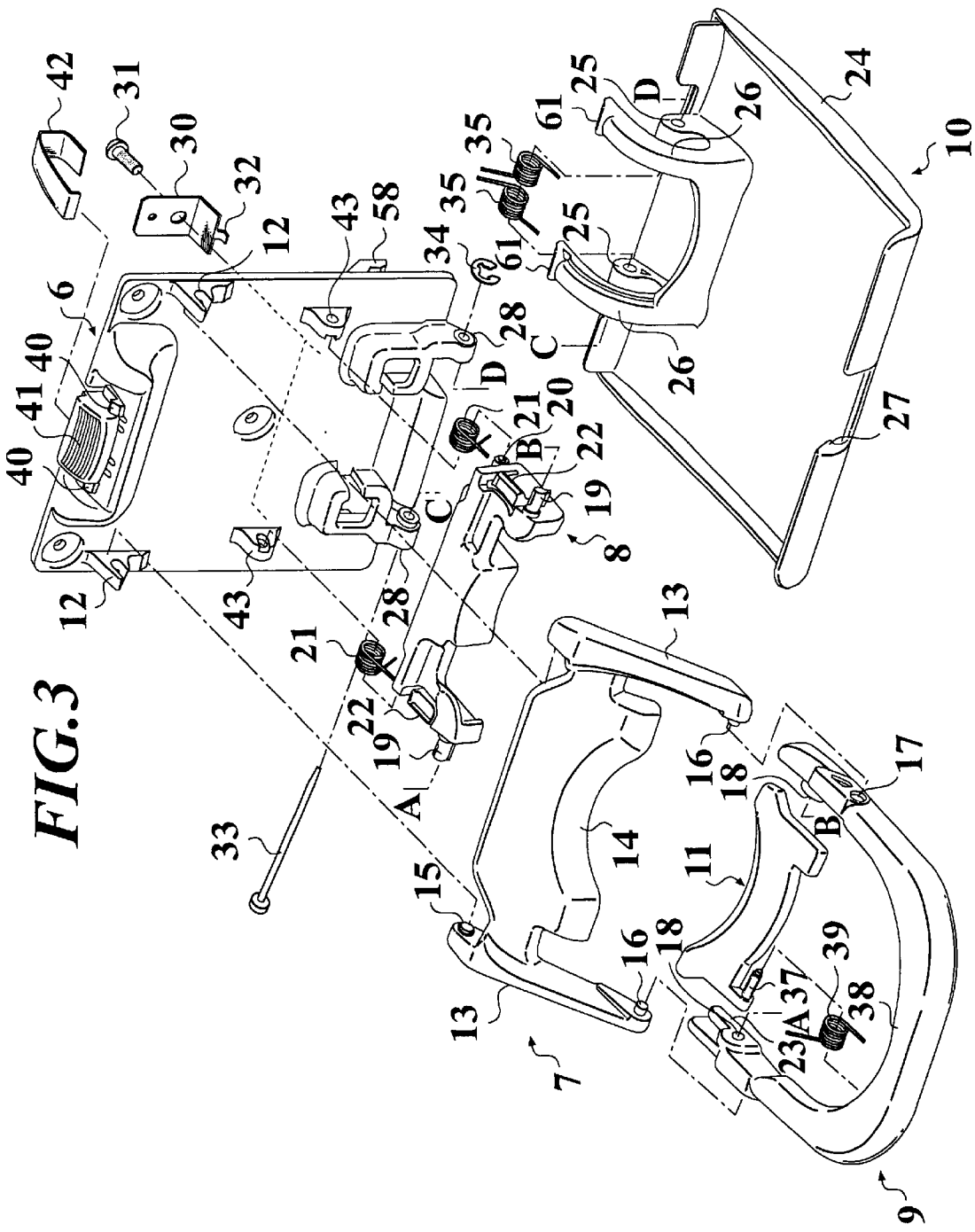
FIG. 3 is a perspective exploded view of the container holder according to the embodiment of the present invention.
Figure 4:
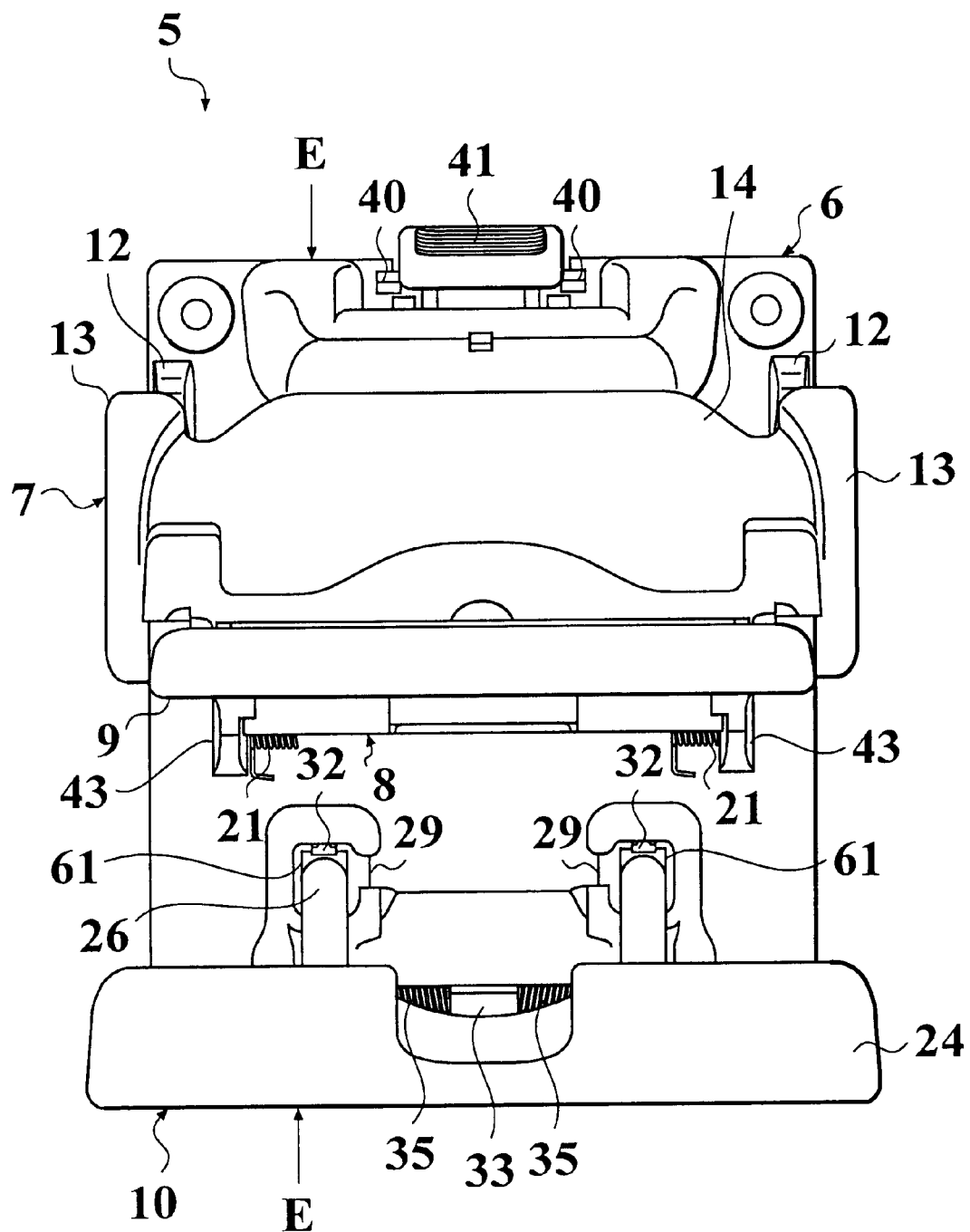
FIG. 4 is a front view of the container holder according to the embodiment of the present invention.
Figure 5:
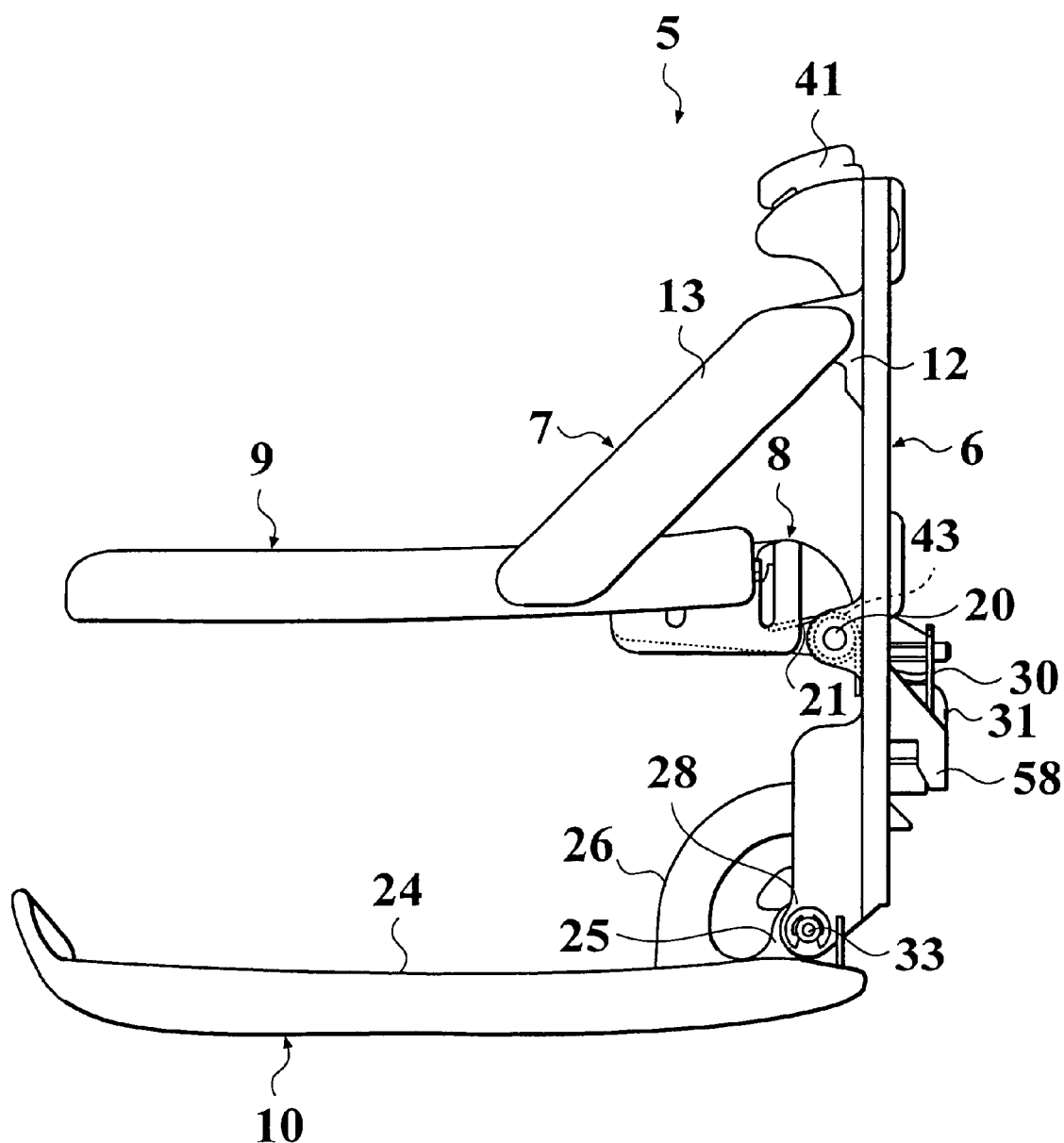
FIG. 5 is a side view of the container holder according to the embodiment of the present invention.
Figure 6:
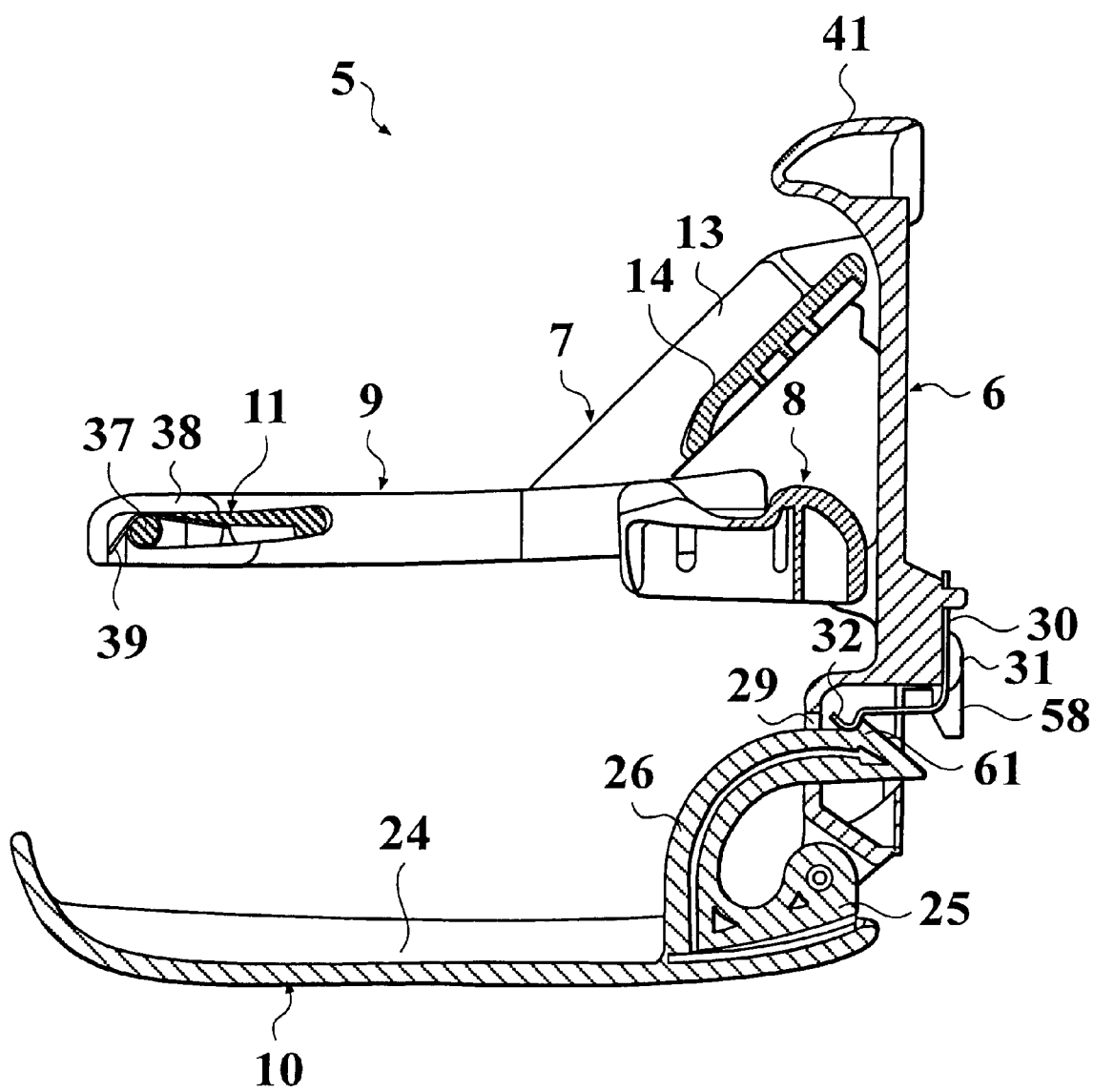
FIG. 6 is a cross-section taken along the line E—E in FIG. 4.
Figure 7:
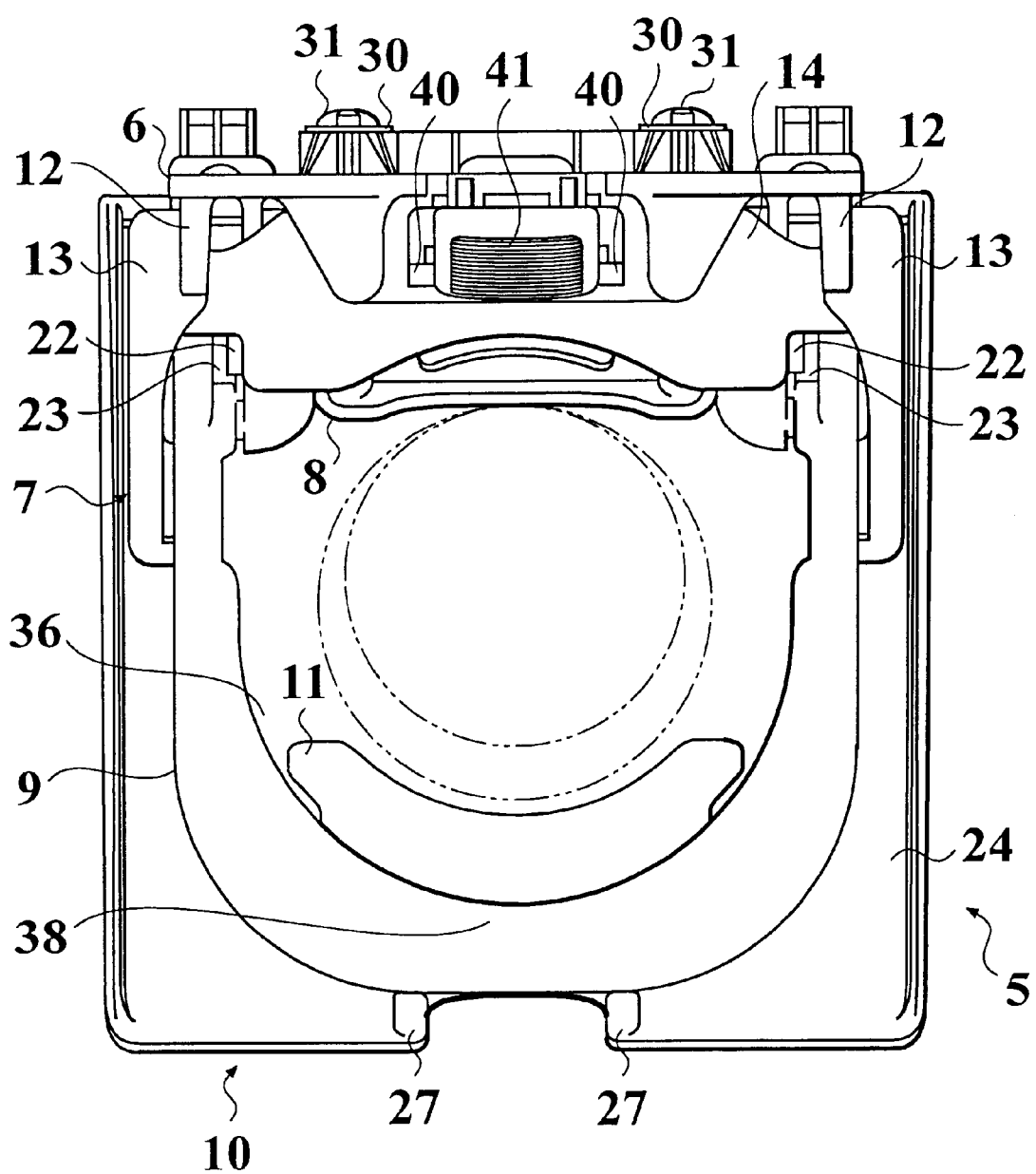
FIG. 7 is a plan view of the container holder according to the embodiment of the present invention.
Figure 8:
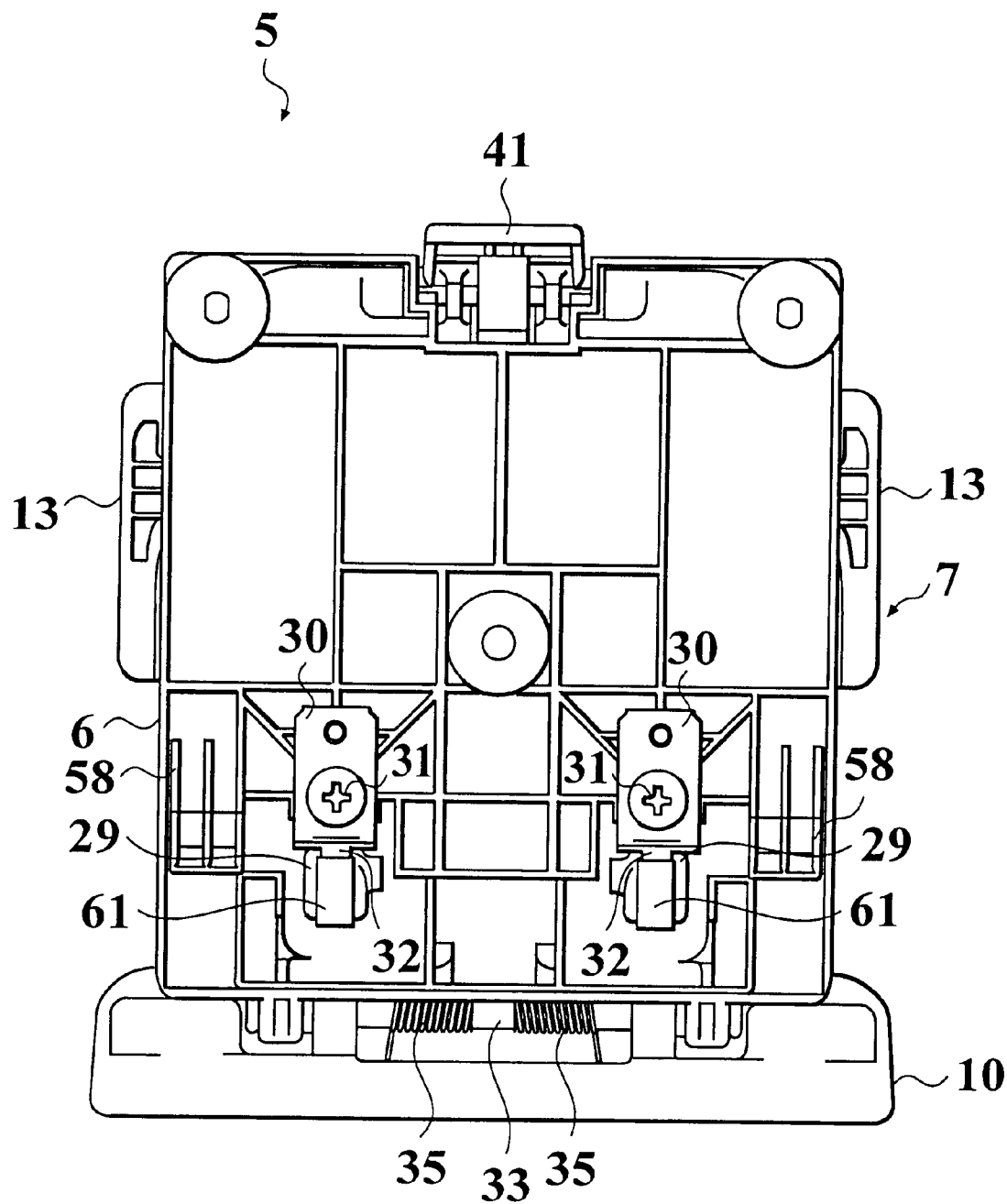
FIG. 8 is a back view of the container holder according to the embodiment of the present invention.

The cup holder 5 and the side cover 4 will be explained in detail. FIG. 2A is a perspective exploded view showing that the cup holder 5 is detached from the side cover 4. FIG. 2B is an enlarged schematic perspective view of a back surface of the side cover 4 when the cup holder 5 is attached to the side cover 4, when looking from the direction indicated with X. FIG. 3 is a perspective exploded view of the disassembled cup holder 5. FIG. 4 is a front view of the cup holder 5. FIG. 5 is a side view of the cup holder 5. FIG. 6 is a cross-section taken along the line E—E in FIG. 4. FIG. 7 is a plan view of the cup holder 5. FIG. 8 is a back view of the cup holder 5. FIG. 2A, FIG. 4, FIG. 5, FIG. 6, FIG. 7 and FIG. 8 show a state that the container can be held in the cup holder 5 (a position of the cup holder 5 in this state is referred to as "opened position"). FIG. 4, FIG. 5, FIG. 6, FIG. 7 and FIG. 8 show a state that the cup holder 5 is detached from the side cover 4.

Figure 9:
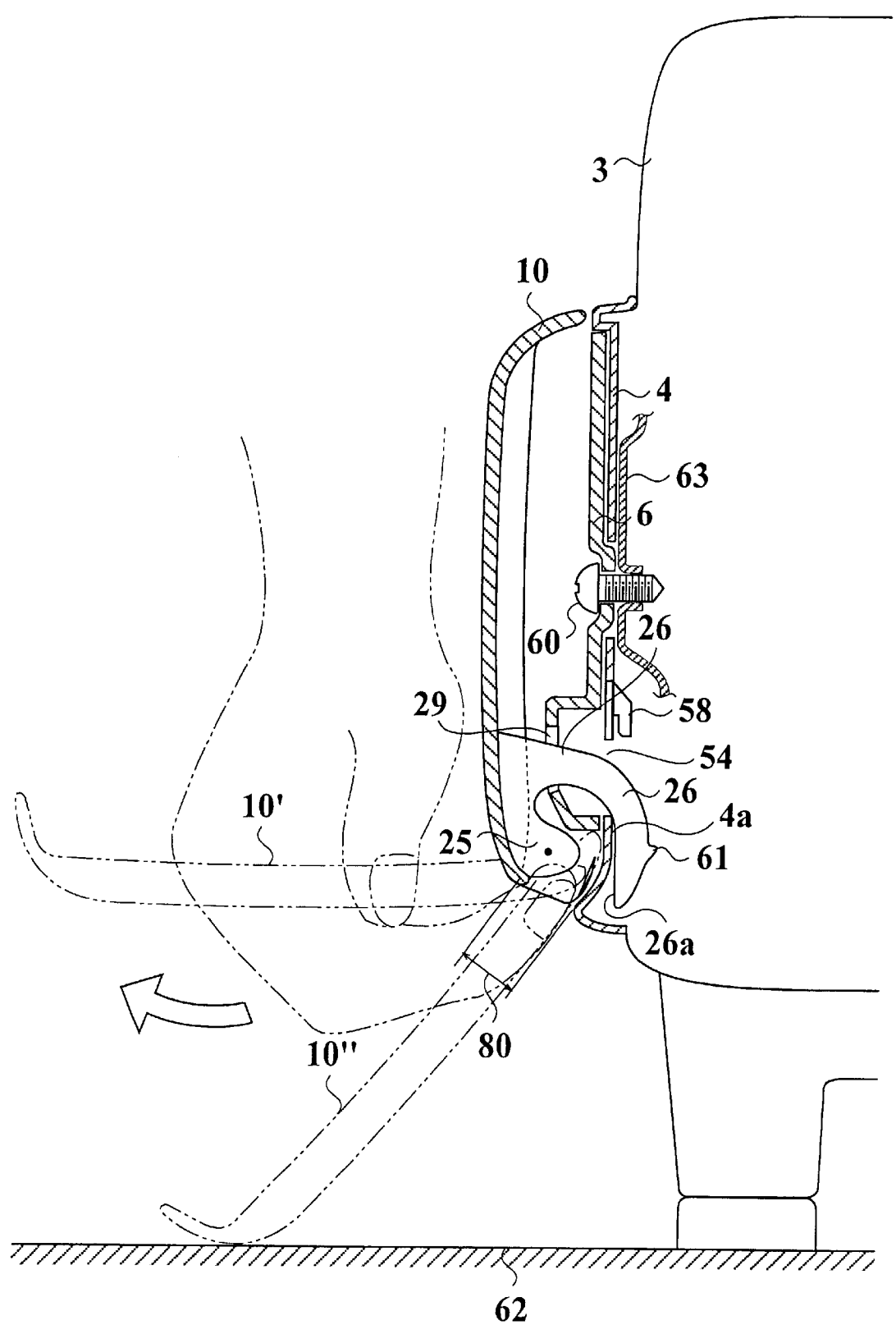
FIG. 9 is a sectional side view schematically showing the container holder.

As shown in FIG. 2A, a recess portion 51 is formed in the fore portion of the side cover 4. A pair of penetrating openings 52 which penetrate the side cover 4 from a front surface to a back surface are formed in a bottom surface of the recess portion 51. The penetrating openings 52 are disposed on opposite sides of the upper edge portion of the bottom surface of the recess portion 51. A penetrating opening 55 which penetrates the side cover 4 from the front surface to the back surface is formed in a central portion of the bottom surface of the recess portion 51. In a lower portion of the bottom surface of the recess portion 51, a pair of penetrating openings 53 which penetrate the side cover 4 from the front surface to the back surface are formed. A penetrating opening (a second penetrating opening) 54 which penetrates the side cover 4 from the front surface to the back surface is formed below the penetrating opening 55. The penetrating opening 54 is formed into an approximately H-like shape. The side cover 4 has a flat area 4a as shown in FIG. 2B and FIG. 9 in the back surface of the side cover 4, right below the penetrating opening 54.

As shown in FIG. 2A to FIG. 8, the cup holder 5 comprises a base member 6 to which various members are attached, and the first holding member 8 and second holding member 9 for holding the container such that the first and second holding members 8 and 9 surround a side surface of the container. The cup holder 5 also comprises an arm member 7 for turnably supporting the first holding member 8, a saucer member 10 on which the container is placed, a flap member 11 for stably holding the container, or the like.

The base member 6 is made of hard resin. A pair of penetrating openings 56 which penetrate the base member 6 from a front surface to a back surface are formed in an upper edge portion of the base member 6. In a central portion of the base member 6, a penetrating opening 57 is formed from the front surface to the back surface. A pair of engaging claws 58 are formed on a lower portion of the back surface of the base member 6, and project therefrom. The engaging claws 58 are bent downward. A pair of bearings 12 are formed on both side portions of the upper portion of the front surface of the base member 6.

The back surface of the base member 6 abuts with the bottom surface of the recess portion 51, so that the base member 6 extends vertically and is attached to the side cover 4. That is, the engaging claws 58 engage with the side cover 4 below the penetrating openings 53, while the engaging claws 58 penetrate the penetrating openings 53 from the front surface of the side cover 4 to the back surface thereof. Furthermore, screws (bolts) 59 penetrate the penetrating openings 56 and the penetrating openings 52, and are fixed with an attachment stay 63 (shown in FIG. 9) on the back surface of the side cover 4. The screws 59 are fixed with the attachment stay 63, thereby the upper portion of the base member 6 is secured to the upper portion of the side cover 4. A screw 60 penetrates the penetrating opening 57 and the penetrating opening 55, and is fixed with the attachment stay 63 on the back surface of the side cover 4. The attachment stay 63 is fixed to the side portion of the seat bottom 3. The side cover 4 is attached to the side portion of the seat bottom 3, covering the attachment stay 63.

The arm member 7 is made of hard resin. The arm member 7 comprises a pair of long arm portions 13 and a flange portion 14 between the two arm portions 13. The arm portions 13 are integrally formed with the flange portion 14. A base edge portion of the arm portion 13 is provided with a shaft portion 15. The shaft portion 15 extends rearward or forward, that is, in a travel direction of the vehicle. The other edge portion of the arm portion 13 is provided with a shaft portion 16 extending rearward or forward. The shaft portions 15 are turnably supported by the bearings 12 of the base member 6. Thereby, the arm member 7 is attached to the base member 6, while the arm member 7 freely pivots up and down on the shaft portions 15.

The second holding member 9 is formed into an approximately U-like shape and made of hard resin. Bearings 17 are formed in the both side portions of the second holding member 9. Further, bearings 18 are formed in the both side portions of the second holding member 9, behind the bearings 17. The shaft portions 16 formed in the other edge portions of the arm portions 13 are turnably supported by the bearings 17. Thereby, the second holding member 9 is attached to the arm member 7, while the second holding member 9 freely pivots up and down on the shaft portions 16. The second holding member 9 is connected to the base member 6 through the arm member 7, while the second holding member 9 is turnable up and down.

The first holding member 8 is made of hard resin. In the opposite side portions of the first holding member 8, shaft portions 19 extending rearward or forward and projecting outward are formed. Further, shaft portions 20 extending laterally are formed in the opposite side portions of the first holding member 8, behind the shaft portions 19. The shaft portions 19 are turnably supported by the bearings 18 of the second holding member 9. Thereby, the second holding member 9 is attached to the first holding member 8, while the second holding member 9 freely pivots on the shaft portions 19.

In vertically intermediate portion of the base member 6, bearings 43 are formed on opposite side portions of the front surface of the base member 6. The shaft portions 20 of the first holding member 8 are turnably supported by the bearings 43. Thereby, the first holding member 8 is attached to the base member 6, while the first holding member 8 freely pivots up and down on the shaft portions 20.

The shaft portions 20 are inserted in coil springs 21. One edge portion of the coil spring 21 abuts with the front surface of the base member 6, while the other edge portion abuts with a lower surface of the first holding member 8. The coil springs 21 energize the first holding member 8 in a direction that the first holding member 8 turns upward, that is, in a direction that the first holding member 8 pivots clockwise in FIG. 5. Thus, the second holding member 9 is energized in a direction of turning downward on the shaft portions 16, that is, in a direction of turning counterclockwise on the shaft portions 16 in FIG. 5. However, engaging claws 22 to be subsequently described engage with engaging portions 23, so that the turns of the second holding member 9 and the first holding member 8 by the energizing force of the coil springs 21 are restrained.

The engaging claws 22 are formed in the both side portions of the first holding member 8, and disposed between the shaft portions 19 and the shaft portions 20. The engaging claws 22 bend at bases thereof abutting with a body of the first holding member 8. The engaging portions 23 are formed in the opposite side portions of the second holding member 9, and disposed behind the bearings 18, that is, in back edge portions of the second holding member 9. The engaging portions 23 are located under the engaging claws 22. The engaging claws 22 are brought into contact with the engaging portions 23. Thereby, the turnings of the second holding member 9 and the first holding member 8 by the energizing force of the coil springs 21 are restrained or suppressed. While the engaging claws 22 abut or engage with the engaging portions 23, the second holding member 9 is held in an approximately horizontal position.

When the second holding member 9 is held in the approximately horizontal position, the first holding member 8 and the second holding member 9 form a hold opening 36 which is circularly surrounded by the first holding member 8 and the second holding member 9. When the container is inserted in the hold opening 36, the horizontal movement of the container is limited, so that the container is held in the cup holder 5.

The flap member 11 is attached to the second holding member 9, and is located in the hold opening 36 as shown in FIG. 7 when looking in plan. The flap member 11 has an approximately arced back edge. A shaft portion 37 extending rearward or forward is formed in a front edge portion of the flap member 11. On the other hand, the second holding member 9 has a flange portion 38 extending from side to side in a front edge portion of the second holding member 9 such that the flange portion 38 faces the hold opening 36. A bearing (not shown) is formed in a lower surface of the flange portion 38. The shaft portion 37 is turnably supported by the bearing. Thereby, the flap member 11 is pivotally attached to the second holding member 9. The shaft portion 37 is inserted in the coil spring 39. One edge portion of the coil spring 39 abuts with the lower surface of the flap member 11, while the other edge portion of the coil spring 39 abuts with the lower surface of the flange portion 38. The coil spring 39 energizes the flap member 11 in the direction that the flap member 11 turns upward, that is, in the direction that the flap member 11 pivots counterclockwise in FIG. 5. However, the upper surface of the flap member 11 is brought into contact with the lower surface of the flange portion 38, so that the turn of the flap member 11 by the energizing force of the coil spring 39 is restrained. While the flap member 11 abuts with the flange portion 38, the flap member 11 is held in an approximately horizontal position, and the flap member 11 extends backward from the flange portion 38 when looking in plan.

The saucer member 10 comprises an approximately rectangular and plate-like saucer body 24, and a pair of shaft supporting portions 25 formed in a back edge portion of the saucer body 24. The saucer member 10 further comprises a pair of curved bars 26, that is, bar-like members, projecting upward from the back portion of the saucer body 24 and curving backward, and a pair of engaging portions 27 formed in a front edge portion of the saucer body 24. These are integrally formed, and the saucer member 10 is made of hard resin. The curved bars 26 curve around the shaft supporting portions 25 (that is, a shaft member 33 to be subsequently described) in an approximately arc. A head of the curved bar 26 is provided with an engaging claw (a second engaging portion) 61. The curved bar 26 has a flat surface 26$a$ in a surface which is opposite to a side at which the engaging claw 61 is formed as shown in FIG. 2B and FIG. 9.

A pair of penetrating openings (first penetrating openings) 29 penetrating the base member 6 from the back surface to the front surface of the base member 6 are formed in a lower portion of the base member 6. The penetrating openings 29 locate in the penetrating opening 54 of the side cover 4 when looking from the front, as shown in FIG. 4. Leaf springs 30 made of metal and having flexibility are attached to the back surface of the base member 6 through screws 31 right above the penetrating openings 29. An engaging tip (a first engaging portion) 32 is formed at a front edge of the leaf spring 30. The engaging tip 32 is disposed in the penetrating opening 29.

On a lower edge portion of the base member 6, bearings 28 are formed. The shaft member 33 extending from side to side is inserted in the bearings 28. The shaft member 33 is attached to the base member 6 with an E-ring 34. The shaft member 33 is also inserted in the shaft supporting portions 25 of the saucer member 10, so that the shaft member 33 freely turns against the shaft supporting portions 25. Thereby, the saucer member 10 is attached to the lower edge portion of the base member 6, while the saucer member 10 freely pivots up and down on the shaft member 33.

The shaft member 33 is inserted in coil springs (energizing members) 35. One edge portion of the coil spring 35 abuts with the front surface of the base member 6. The other edge portion of the coil spring 35 abuts with an upper surface of the saucer body 24. Hereinafter, the upper surface of the saucer body 24 in the horizontal position is referred to as a back surface, while a lower surface of the saucer body 24 in the horizontal position is referred to as a front surface. The coil springs 35 energize or biases the saucer member 10 in a direction that the saucer member 10 turns downward, that is, in a direction that the saucer member 10 turns counterclockwise in FIG. 5. When the engaging claws 61 to be described later engage with the engaging tips 32, the turn of the saucer member 10 by the energizing force of the coil springs 35 is restrained, so that the saucer body 24 is held in an approximately horizontal position.

The curved bars 26 are provided with the engaging claws 61 on the heads of the curved bars 26. The curved bars 26 extend from the back surface of the saucer body 24 toward the penetrating openings 29, and penetrate the penetrating openings 29 and the penetrating opening 54. The engaging claws 61 are located behind the engaging tips 32, and brought into contact with the engaging tips 32. The curved bars 26 move through the penetrating openings 29 and the penetrating opening 54 as the saucer member 10 turns. However, the engaging claws 61 are brought into contact with the engaging tips 32, restraining the turn of the saucer member 10. That is, the turn of the saucer member 10 by the coil springs 35 is restrained by abutment or engagement of the engaging claws 61 with the engaging tips 32.

The front edge portion of the saucer body 24 is provided with the engaging portions 27. On the other hand, the upper edge portion of the base member 6 is provided with engaging claws (engaging portions for standing position) 40 which are capable of engaging with the engaging portions 27. The upper edge portion of the base to member 6 is also provided with a push button 41 integrally formed with the engaging claws 40. A leaf spring 42 is fitted in the back of the push button 41. When the saucer member 10 in the horizontal position is turned upward against the energizing force of the coil springs 35, the engaging portions 27 engage with the engaging claws 40. When the engaging portions 27 engage with the engaging claws 40, the saucer body 24 stands approximately vertically and covers the recess portion 51 of the side cover 4. The front surface of the saucer body 24 is flush with the front surface of the side cover 4, as shown in FIG. 1. In this state, the arm member 7, the first holding member 8, the second holding member 9, the flap member 11 and the like are housed or stored in a space surrounded by the saucer body 24 and the base member 6. Hereinafter, a position of the cup holder 5 in this state is referred to as a housed position.

When the engaging portions 27 engage with the engaging claws 40 and the push button 41 is pressed downward against the leaf spring 42, the engaging claws 40 are separated from the engaging portions 27, so that the engagement between the engaging portions 27 and the engaging claws 40 is released.

The action and using method of the cup holder 5 constructed as described above will be explained.

When the cup holder 5 is held in the opened position, that is, the engaging claws 22 engage with the engaging portions 23 to hold the second holding member 9 in the approximately horizontal position, and the engaging claws 61 engage with the engaging tips 32 to hold the saucer body 24 in the approximately horizontal position, the passenger inserts the container in the hold opening 36 from above. The container is brought into contact with the flap member 11, so that the flap member 11 is turned downward by the container against the energizing force of the coil spring 39. When the passenger further moves the container downward, a bottom surface of the container is brought into contact with the back surface of the saucer body 24, so that the container is placed on the saucer body 24. In this state, the flap member 11 abuts with the side surface of the container by the energizing force of the coil spring 39, and the container is sandwiched between the flap member 11 and the first holding member 8. Therefore, the container is stably held. Furthermore, in such a state, because the container is held by the saucer member 10, moment toward the side cover 4 is applied on the base member 6 with respect to the upper portion of the base member 6. That is, the lower portion of the base member 6 is pressed against the bottom surface of the recess portion 51 by the weight of the container held on the saucer member 10. Therefore, even if the lower portion of the base member 6 is not fixed to the side cover 4 with the screw, the bolt or the like, the cup holder 5 is firmly attached to the side cover 4.

When the passenger pulls upward the container which is held on the saucer member 10 out of the hold opening 36, the flap member 11 turns upward by the energizing force of the coil spring 39, and then is brought into contact with the flange portion 38. Thus, the flap member 11 is maintained in an approximately horizontal position. In FIG. 7, a cylindrical container is shown with chain double-dashed lines.

When the cup holder 5 is held in the opened position, and the passenger pushes up the saucer member 10, the saucer member 10 pivots upward on the shaft member 33 against the energizing force of the coil springs 35. Thereby, the engaging claws 61 are separated backward from the engaging tips 32. The curved bars 26 are turned on the shaft member 33, and the heads of the curved bars 26 are moved to the side of the back surface of the side cover 4 and below the penetrating opening 54. When the passenger further turns upward the saucer member 10, the saucer member 10 is brought into contact with the second holding member 9. When the saucer member 10 is further turned upward, the second holding member 9 is pushed up by the saucer member 10, and turned upward on the shaft portions 19, while the arm member 7 is turned downward on the shaft portions 15. When the saucer member 10 is further turned upward, as shown in FIG. 9, the saucer body 24 extends approximately vertically and comes to the standing position, so that the engaging portions 27 engage with the engaging claws 40. Thus, the cup holder 5 is closed and held in the housed position, while the arm member 7 and the second holding member 9 are held in the standing position. When the cup holder 5 is held in the housed position, the engaging claws 40 are held to engage with the engaging portions 27 by the energizing force of the leaf spring 42.

When the cup holder 5 is held in the housed position, the heads of the curved bars 26 are located in the side of the back surface of the side cover 4 which intervenes between the saucer body 24 and the heads of the curved bars 26 which are hooked on the lower portion of the side cover 4. The flat surface 26a of the curved bar 26 abuts with the flat area 4a in the lower portion of the side cover 4. Thus, the curved bars 26 are stably hooked on the back surface of the side cover 4. Since the curved bars 26 are hooked on the lower portion of the side cover 4, the cup holder 5 is stably attached to the side cover 4.

Furthermore, when the cup holder 5 is held in the housed position, if the passenger pulls the saucer member 10, that is, if the passenger inserts his finger in the opening 80 and pulls the saucer member 10 in the direction of an arrow as shown in FIG. 9, the load is applied in the direction that the base member 6 is separated from the side cover 4. However, because the curved bars 26 are hooked on the lower portion of the side cover 4, the load is not concentrated in the portions where the base member 6 and the side cover 4 are fixed by the screws 59 or the screw 60. Therefore, even if the passenger accidentally pulls the saucer member 10, the breakage of the base member 6 and the side cover 4 is prevented. In FIG. 9, a reference numeral 10' indicated with a chain double-dashed line imaginary shows the saucer member 10 which is held in the horizontal position. In FIG. 9, for simplifying the drawing, the first holding member 8 and the second holding member 9 are not shown.

When the cup holder 5 is held in the housed position, and the passenger presses down the push button 41 against the leaf spring 42, the engagement between the engaging portions 27 and the engaging claws 40 is released. Thereby, the second holding member 9 is turned downward by the energizing force of the coil springs 21, while the saucer member 10 is turned downward by the energizing force of the coil springs 35. Then, the engaging portions 23 of the second holding member 9 engage with the engaging claws 22 of the first holding member 8, so that the arm member 7, the first holding member 8 and the second holding member 9 are stopped, and the second holding member 9 is held in the approximately horizontal position. On the other hand, the engaging claws 61 of the saucer member 10 engage with the engaging tips 32, stopping the saucer member 10. Thus, the saucer body 24 is held in the approximately horizontal position. That is, the cup holder 5 is held in the opened position.

Figure 10:
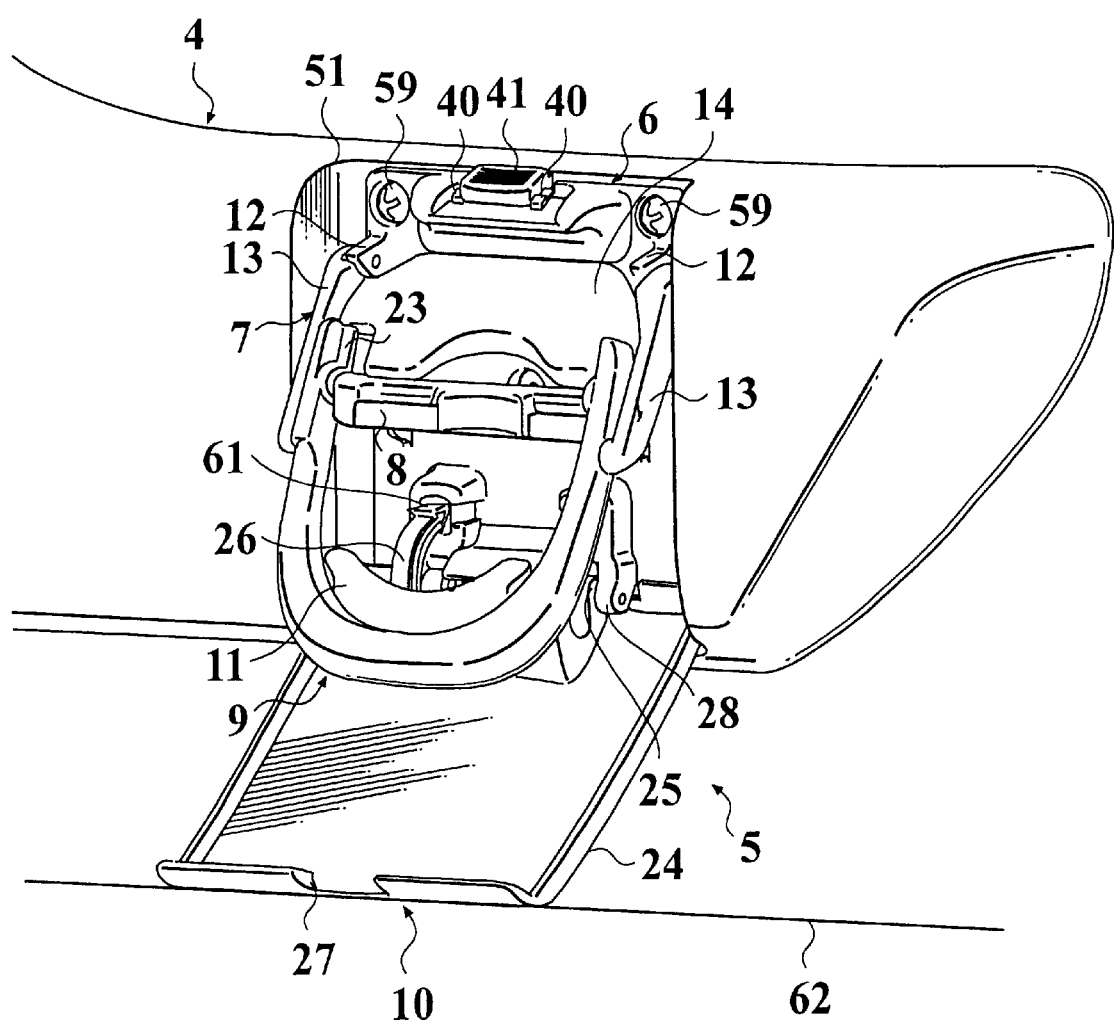
FIG. 10 is a perspective view of the container holder according to the embodiment of the present invention, showing that a holder member and a saucer member hang beyond the horizontal position.

When the cup holder 5 is held in the opened position, for example, if the body of the passenger is accidentally hit against the saucer member 10, an excessive load is applied to the saucer body 24 which is held in the horizontal position, in the direction of turning downward. Because the leaf springs 30 have flexibility, the engaging claws 61 bend the leaf springs 30 under the excessive load. Thereby, the engagement between the engaging tips 32 and the engaging claws 61 is released, so that the engaging claws 61 can move to the front of the engaging tips 32. Thus, in case the excessive load is applied, the saucer member 10 can turn downward. Therefore, as shown in FIG. 10, the saucer member 10 hangs, and the front edge of the saucer member 10 abuts with the floor 62 of the interior. When the passenger turns upward the saucer body 24 from such a state, the engaging claws 61 cross over the engaging tips 32 and engage with the engaging tips 32. Thus, the saucer body 24 returns to the original, horizontal position. In FIG. 9, a reference numeral 10" indicated with a chain double-dashed line imaginary shows the saucer member 10 which hangs.

As described above, according to the present embodiment, even if the excessive load is accidentally applied to the saucer member 10, the engaging tips 32 bend because the engaging tips 32 have flexibility. Thereby, the engagement between the engaging tips 32 and the engaging claws 61 is released. Therefore, the breakage of the engaging claws 61, the curved bars 26 or the leaf springs 30 is restrained, and thickening of the wall thickness of the engaging claws 61, the curved bars 26 or the leaf springs 30 is not required.

When the cup holder 5 is held in the housed position, the front surface of the saucer member 10 (that is, the saucer body 24) is flush with the front of the side cover 4. Thus, the saucer member 10 is neatly housed in the recess portion 51 of the side cover 4, so that the cup holder 5 does not obstruct the operation or view of the passenger.

Since the cup holder 5 is disposed in the side of the seat bottom 3, the passenger sat in the seat bottom 3 can place the container on the saucer member 10 or pick up the container which is placed on the saucer member 10 without changing his position.

Because the saucer member 10, the arm portions 13, the first holding member 8 and the second holding member 9 are disposed on the front surface of the base member 6, it is difficult that the screwing of the base member 6 on the side cover 4 from the lower portion of the front surface of the base member 6 toward the lower portion of the side cover 4. However, in this embodiment, the curved bars 26 is hooked on the lower portion of the side cover 4 when the saucer member is held in the standing position, so that the base member 6 is firmly attached to the side cover 4 without fixing the screw in the base member 6 and the side cover 4.

From the foregoing description, one skilled in the art can easily ascertain the essential characteristics of this invention, and without departing from the spirit and scope thereof, can make various changes and modifications of the invention to adapt it to various usage and conditions.

For example, the engaging portions 23 or the engaging claws 61 may have flexibility. Furthermore, instead of the coil springs 21, 35 and 39, the elastic member, such as the leaf spring or the like, which energizes elastically other members may be used.

The entire disclosure of Japanese Patent Application No. 2001-244240 filed on Aug. 10, 2001 including specification, claims, drawings and summary are incorporated herein by reference in its entirety.

What is claimed is:

1. A vehicle seat having a container holder, comprising:
   a container holder comprising:
      a base member extending vertically, in which a first penetrating opening which penetrates the base member from a front surface to a back surface is formed in a lower portion of the base member; and
      a saucer member supported on a lower portion of a front surface of the base member, the saucer member being pivotable up and down on the lower portion of a front surface of the base member and capable of turning from a standing position to a horizontal position which is approximately horizontal such that a container can be placed on the saucer member, and the saucer member comprising a support member for holding the saucer member which is held in the horizontal position;
   a seat body in which a passenger sits; and
   a side member attached to a side portion of the seat body, wherein an upper portion of the base member is secured to a front surface of the side member, and a second penetrating opening which penetrates the side member from the front surface to a back surface is formed in a lower portion of the side member;

wherein when the saucer member is held in the standing position, the support member penetrates the first penetrating opening and the second penetrating opening and is hooked on the back surface of the side member.

2. The vehicle seat having a container holder as claimed in claim 1, wherein the side member has a flat area in the back surface of the side member, the support member has a flat surface in an edge portion of the support member, and when the saucer member is held in the standing position, the support member is hooked on the back surface of the side member while the flat surface abuts with the flat area.

3. The vehicle seat having a container holder as claimed in claim 1, wherein a recess portion is formed in the side member, the base member is disposed on a bottom surface of the recess portion and secured to the side member, and when the saucer member is held in the standing position, the saucer member is disposed in the recess portion such that a front surface of the saucer member is flush with the front surface of the side member.

4. The vehicle seat having a container holder as claimed in claim 1, wherein the side member is attached to a side portion of a seat bottom of the seat body, and the container holder is disposed in a side of the seat bottom.

5. The vehicle seat having a container holder as claimed in claim 1, wherein the base member is provided with a first engaging portion which is disposed in the first penetrating opening, the support member comprises a second engaging portion which engages with the first engaging portion to hold the saucer member in the horizontal position, at least one of the first engaging portion and the second engaging portion has flexibility, and when at least one of the first engaging portion and the second engaging portion bends, the engagement between the first engaging portion and the second engaging portion is released such that the saucer member turns downward from the horizontal position.

6. The vehicle seat having a container holder as claimed in claim 1, wherein an energizing member is disposed between the base member and the saucer member, the energizing member energizes the saucer member so that the saucer member turns from the standing position to the horizontal position, and the base member comprises an engaging portion for standing position, which is capable of engaging with the saucer member such that the saucer member is held in the standing position.

7. A container holder comprising:

a base member extending vertically, in which a first penetrating opening which penetrates the base member from a front surface to a back surface is formed in a lower portion of the base member, wherein an upper portion of the base member is adapted to be secured to a front surface of a side member which is attached to a side portion of a vehicle seat body; and a saucer member supported on a lower portion of a front surface of the base member, the saucer member being pivotable up and down on the lower portion of a front surface of the base member and capable of turning from a standing position to a horizontal position which is approximately horizontal such that a container can be placed on the saucer member, and the saucer member comprising a support member for holding the saucer member in the horizontal position;

wherein when the saucer member is held in the standing position, the support member penetrates the first penetrating opening and is adapted to penetrate a second penetrating opening which is formed in a lower portion of the side member, and the support member is adapted to be hooked on a back surface of the side member.

8. The vehicle seat having a container holder as claimed in claim 1, wherein the support member has a curved shape.

9. The container holder as claimed in claim 7, wherein the support member has a curved shape.

* * * * *